United States Patent
Morimoto et al.

(10) Patent No.: US 10,040,452 B2
(45) Date of Patent: Aug. 7, 2018

(54) VEHICLE CONTROL APPARATUS

(71) Applicant: TOYOTA JIDOSHA KABUSHIKI KAISHA, Toyota-shi, Aichi (JP)

(72) Inventors: Kazuhiro Morimoto, Toyota (JP); Katsuhiro Matsuoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/243,063

(22) Filed: Aug. 22, 2016

(65) Prior Publication Data

US 2017/0080934 A1     Mar. 23, 2017

(30) Foreign Application Priority Data

Sep. 18, 2015   (JP) .................. 2015-186045

(51) Int. Cl.
*B60W 30/14*   (2006.01)
*B60W 50/14*   (2012.01)
*B60W 30/16*   (2012.01)

(52) U.S. Cl.
CPC .......... *B60W 30/143* (2013.01); *B60W 30/16* (2013.01); *B60W 50/14* (2013.01); *B60W 2400/00* (2013.01); *B60W 2520/105* (2013.01); *B60W 2540/04* (2013.01); *B60W 2540/12* (2013.01); *B60W 2550/402* (2013.01); *B60W 2550/408* (2013.01)

(58) Field of Classification Search
CPC .... B60W 30/143; B60W 30/16; B60W 50/14; B60W 2550/408; B60W 2550/402; B60W 2540/12; B60W 2540/04; B60W 2520/105; B60W 2400/00
See application file for complete search history.

(56) References Cited

U.S. PATENT DOCUMENTS

2011/0169625 A1*   7/2011   James ................... B60Q 9/008
                                                                    340/439

FOREIGN PATENT DOCUMENTS

JP     2000130205 A   *  5/2000
JP     2004-171459 A      6/2004

OTHER PUBLICATIONS

Machine Translation JP 2000-130205 published May 2000.*

* cited by examiner

*Primary Examiner* — Anne M Antonucci
(74) *Attorney, Agent, or Firm* — Oliff PLC

(57) ABSTRACT

A vehicle control apparatus of the invention determines whether or not an informing condition is satisfied. The informing condition becomes satisfied when a particular situation regarding an own vehicle traveling that a driver of the own vehicle should be alerted occurs. The apparatus executes an informing control for alerting the driver when the informing condition is satisfied and executes a cruise control for causing the own vehicle to travel when a cruise condition is satisfied. The apparatus executes an adjustment process for forbidding the informing control and permitting the cruise control when both the informing and cruise conditions are satisfied and the own vehicle is accelerated or decelerated by the cruise control and for permitting both the informing and cruise controls when both the informing and cruise conditions are satisfied and the own vehicle is not accelerated nor decelerated by the cruise control.

3 Claims, 12 Drawing Sheets

| | | INFORMING CONDITION SATISFIED |
|---|---|---|
| CRUISE CONDITION SATISFIED | ACCELERATION/ DECELERATION REQUESTED ($|G_j| > \alpha$) | (a) CRUISE → PERMITTED INFORMING → FORBIDDEN |
| | CONSTANT VEHICLE SPEED TRAVEL REQUESTED ($|G_j| \leq \alpha$) | (b) CRUISE → PERMITTED INFORMING → PERMITTED |

FIG. 3

| SATISFIED FIRST \ SATISFIED LATER | | INFORMING CONDITION SATISFIED |
|---|---|---|
| CRUISE CONDITION SATISFIED | ACCELERATION/ DECELERATION REQUESTED ($|G_j| > \alpha$) | (c) CRUISE → PERMITTED INFORMING → FORBIDDEN |
| | CONSTANT VEHICLE SPEED TRAVEL REQUESTED ($|G_j| \leq \alpha$) | (d) CRUISE → PERMITTED INFORMING → PERMITTED |

FIG. 7A

| SATISFIED LATER \ SATISFIED FIRST | | INFORMING CONDITION SATISFIED |
|---|---|---|
| CRUISE CONDITION SATISFIED | ACCELERATION/ DECELERATION REQUESTED ($|G_j| > \alpha$) | (e) ·CRUISE → FORBIDDEN ·INFORMING → PERMITTED |
| | CONSTANT VEHICLE SPEED TRAVEL REQUESTED ($|G_j| \leq \alpha$) | |

FIG. 7B

| | | INFORMING CONDITION SATISFIED | |
|---|---|---|---|
| | | INFORMING REQUIREMENT LEVEL HIGH | INFORMING REQUIREMENT LEVEL LOW |
| CRUISE CONTROL SATISFIED | ACCELERATION/ DECELERATION REQUESTED ($|G_j| > \alpha$) | (f) CRUISE → FORBIDDEN INFORMING → PERMITTED | (g) CRUISE → PERMITTED INFORMING → FORBIDDEN |
| | CONSTANT VEHICLE SPEED TRAVEL REQUESTED ($|G_j| \leq \alpha$) | | (h) CRUISE → PERMITTED INFORMING → PERMITTED |

FIG. 9

| SATISFIED FIRST \ SATISFIED LATER | | INFORMING CONDITION SATISFIED | |
|---|---|---|---|
| | | INFORMING REQUIREMENT LEVEL HIGH | INFORMING REQUIREMENT LEVEL LOW |
| CRUISE CONDITION SATISFIED | ACCELERATION/ DECELERATION REQUESTED ($|G_j| > \alpha$) | (i)<br>CRUISE → PERMITTED<br>INFORMING → FORBIDDEN | |
| | CONSTANT VEHICLE SPEED TRAVEL REQUESTED ($|G_j| \leq \alpha$) | (j)<br>CRUISE → PERMITTED<br>INFORMING → PERMITTED | |

FIG. 11A

| SATISFIED LATER \ SATISFIED FIRST | | INFORMING CONDITION SATISFIED | |
|---|---|---|---|
| | | INFORMING REQUIREMENT LEVEL HIGH | INFORMING REQUIREMENT LEVEL LOW |
| CRUISE CONDITION SATISFIED | ACCELERATION/ DECELERATION REQUESTED ($|G_j| > \alpha$) | (k)<br>CRUISE → FORBIDDEN<br>INFORMING → PERMITTED | (l)<br>CRUISE → PERMITTED<br>INFORMING → FORBIDDEN |
| | CONSTANT VEHICLE SPEED TRAVEL REQUESTED ($|G_j| \leq \alpha$) | | |

FIG. 11B

| FIRST SATISFACTION \ LATER SATISFACTION | | INFORMING CONDITION SATISFIED ||
|---|---|---|---|
| | | INFORMING REQUIREMENT LEVEL HIGH | INFORMING REQUIREMENT LEVEL LOW |
| CRUISE CONDITION SATISFIED | ACCELERATION/ DECELERATION REQUESTED ($|G_j| > \alpha$) | (m) CRUISE → FORBIDDEN INFORMING → PERMITTED ||
| | CONSTANT VEHICLE SPEED TRAVEL REQUESTED ($|G_j| \leq \alpha$) | (n) CRUISE → FORBIDDEN INFORMING → PERMITTED | (o) CRUISE → PERMITTED INFORMING → PERMITTED |

FIG. 12A

| SATISFIED LATER \ SATISFIED FIRST | | INFORMING CONDITION SATISFIED ||
|---|---|---|---|
| | | INFORMING REQUIREMENT LEVEL HIGH | INFORMING REQUIREMENT LEVEL LOW |
| CRUISE CONDITION SATISFIED | ACCELERATION/ DECELERATION REQUESTED ($|G_j| > \alpha$) | (p) CRUISE → FORBIDDEN INFORMING → PERMITTED | (q) CRUISE → PERMITTED INFORMING → FORBIDDEN |
| | CONSTANT VEHICLE SPEED TRAVEL REQUESTED ($|G_j| \leq \alpha$) | ||

FIG. 12B

VEHICLE CONTROL APPARATUS

BACKGROUND OF THE INVENTION

Field of the Invention

The present invention relates to a vehicle control apparatus which is configured to execute a cruise control for causing a vehicle to travel without an operation of an acceleration operator or a brake operator of the vehicle and a driving assist informing for performing an informing for alerting a driver of the vehicle on the basis of road situation information acquired from an outside of the vehicle through a wireless communication.

Description of the Related Art

Conventionally, there is known an apparatus for displaying a lighting color of a traffic light around a vehicle and a time required for the present lighting color to change to a next lighting color on a display of a navigation device of the vehicle (for example, see JP 2004-171459 A).

A constant display of the present lighting color of the traffic light on the display of the navigation device and the like may cause a driver of the vehicle to feel a discomfort. The inventors of this application are developing an informing device for informing the driver of an occurrence of a particular situation which the driver should be alerted, depending on a type of the particular situation when the particular situation occurs.

For example, the informing device may be configured to determine that the particular situation occurs when a distance between the vehicle and the traffic light which lights a red signal becomes a predetermined distance and inform the driver of a fact that the traffic light lights the red signal.

Further, there is known a vehicle having a function for executing an automatic traveling control for causing an own vehicle to travel at a constant vehicle speed or with an inter-vehicle distance between the own vehicle and a preceding vehicle traveling in front of the own vehicle without a driver's operation of an acceleration pedal or a brake pedal of the own vehicle. In general, such an automatic traveling control is called as a cruise control.

When the own vehicle is automatically accelerated or decelerated by the cruise control with the driver of the own vehicle being informed of the occurrence of the particular situation, the driver of the own vehicle may misunderstand that the cruise control is executed in consideration of the particular situation without the driver's operation of the acceleration pedal or the brake pedal of the own vehicle.

The present invention has been made for solving the aforementioned problem. An object of the present invention is to provide a vehicle control apparatus which can suitably inform the driver of the own vehicle of the particular situation without causing the driver of the own vehicle to misunderstand that the cruise control is executed in consideration of the particular situation.

SUMMARY OF THE INVENTION

A vehicle control apparatus according to the present invention (hereinafter, this apparatus will be referred to as "the invention apparatus"), comprises:
- a road situation information acquisition device (70, 80, 81, 90, 91) configured to acquire road situation information on a road situation from an outside of an own vehicle (10) through a wireless communication;
- determination means (20) configured to determine whether or not an informing condition is satisfied on the basis of the road situation information (see determinations of steps 405 and 455 of FIG. 4), the informing condition becoming satisfied when a particular situation regarding an own vehicle traveling that a driver of the own vehicle (10) should be alerted occurs;
- informing means (20, 25, 26) configured to execute an informing control for alerting the driver of the own vehicle (10) (see processes of steps 435 and 460) when the informing condition is satisfied (see determinations "Yes" at the steps 430 and 455, respectively);
- cruise means (20, 30, 32, 40, 43) configured to execute a cruise control for causing the own vehicle (10) to travel without an operation of one of an acceleration operator (33) and an brake operator (44) of the own vehicle (10) (see processes of steps 425 and 450) when a cruise condition is satisfied (see determinations "Yes at steps 405 and 420 and a determination "Yes" at a step 440); and
- adjustment means (20) configured to execute a first adjustment process:
  - for forbidding an execution of the informing control by the informing means (20, 25, 26) (see a process of a step 620 of FIG. 6, a determination "No" at the step 430 of FIG. 4 and a process of a step 439) and permitting an execution of the cruise control by the cruise means (20, 30, 32, 40, 43) (see the process of the step 620, a determination "Yes" at a step 420 and a process of a step 425) when both the informing condition and the cruise condition are satisfied (see the determination "Yes" at the step 405) and the own vehicle (10) is accelerated or decelerated by the cruise control (see a determination "Yes" at a step 610), and
  - for permitting both the execution of the informing control by the informing means (20, 25, 26) and the execution of the cruise control by the cruise means (20, 30, 32, 40, 43) (see the process of the step 630, a determination "Yes" at a step 430, a process of a step 435, the determination "Yes" at the step 420 and the process of the step 425) when both the informing condition and the cruise condition are satisfied (see the determination "Yes" at the step 405) and the own vehicle (10) is not accelerated nor decelerated by the cruise control (see a determination "No" at the step 610).

When the own vehicle is automatically accelerated or decelerated by the cruise control with the informing of the occurrence of the particular situation being performed, the driver of the own vehicle may misunderstand that the own vehicle is automatically accelerated or decelerated in consideration of the particular situation. When the own vehicle is accelerated or decelerated if the cruise control is executed with both the informing and cruise conditions being satisfied, the invention apparatus executes the cruise control without performing the informing of the occurrence of the particular situation. Therefore, it can be prevented from leading to the aforementioned driver's misunderstanding.

On the other hand, even when the informing of the occurrence of the particular situation is performed if the own vehicle is not accelerated nor decelerated by the cruise control, the aforementioned driver's misunderstanding is not led. According to the invention apparatus, when the own vehicle is not accelerated nor decelerated by the cruise control with both the informing and cruise conditions being satisfied, the informing of the occurrence of the particular situation is performed and the cruise control is executed.

Therefore, the driver can be informed of the occurrence of the particular situation without leading the aforementioned driver's misunderstanding.

According to the present invention, the case that the own vehicle is accelerated or decelerated by the cruise control with both the informing and cruise conditions being satisfied includes the case that the own vehicle is accelerated or decelerated by the cruise control which has been executed as well as the case that the own vehicle is accelerated or decelerated if the cruise control is started when the cruise condition becomes satisfied.

The adjustment means (20) may be configured:

to execute the first adjustment process (see processes of steps 830 and 860 of FIG. 8) when the informing condition becomes satisfied with the cruise control having been executed since the cruise condition becomes satisfied before the informing condition becomes satisfied (see determinations "Yes" at steps 820 and 850, respectively); and to execute a second adjustment process for permitting the execution of the informing control by the informing means (20, 25, 26) and forbidding the execution of the cruise control by the cruise means (20, 30, 32, 40, 43) (see processes of steps 840 and 870) when the cruise condition becomes satisfied with the informing control having been executed since the informing condition becomes satisfied before the cruise condition becomes satisfied (see determinations "No" at steps 820 and 850, respectively).

When the execution of the cruise control is terminated and the informing of the occurrence of the particular situation is started, the informing of the occurrence of the particular situation is started immediately after the execution of the cruise control is terminated. In this case, the own vehicle is likely to be decelerated by the termination of the execution of the cruise control and the informing of the occurrence of the particular situation is performed during the deceleration of the own vehicle. In this case, the aforementioned driver's misunderstanding may be led. Therefore, such a driver's misunderstanding can be prevented from being led by executing the first adjustment process to continue the execution of the cruise control without performing the informing of the occurrence of the particular situation when the cruise condition is satisfied before the informing condition is satisfied.

If the informing of the occurrence of the particular situation is terminated and the execution of the cruise control is started when the cruise condition is satisfied with the informing of the occurrence of the particular situation being performed, the own vehicle may be accelerated or decelerated by the cruise control immediately after the informing of the occurrence of the particular situation is terminated. In this case, also, the aforementioned driver's misunderstanding may be led. Therefore, the aforementioned driver's misunderstanding can be prevented from being led by executing the second adjustment process to continue the informing of the occurrence of the particular situation without executing the cruise control when the informing condition is satisfied before the cruise condition is satisfied.

The adjustment means (20) may be configured:

to execute the first adjustment control when the own vehicle (10) is accelerated or decelerated by the cruise control (see a determination "Yes" at a step 1010 of FIG. 10) and a predetermined informing requirement level is a low requirement level (see a determination "No" at a step 1015) with both the informing condition and the cruise condition being satisfied (see the determination "Yes" at the step 405 of FIG. 4), the informing requirement level representing a level of a requirement of informing the driver of the own vehicle (10) of an occurrence of the particular situation, and to execute a third adjustment process for permitting the execution of the informing control by the informing means (20, 25, 26) and forbidding the execution of the cruise control by the cruise means (20,30, 32, 40, 43) (see a process of a step 1020) when the own vehicle (10) is accelerated or decelerated by the cruise control (see the determination "Yes" at the step 1010) and the predetermined informing requirement level is a high level (see a determination "Yes" at the step 1015) with both the informing condition and the cruise condition being satisfied (see the determination "Yes" at the step 405).

The particular situations include a situation having the relatively low informing requirement level that the driver of the own vehicle should be informed of the occurrence of this situation and a situation having the relatively high informing requirement level that the driver of the own vehicle should be informed of the occurrence of this situation. In addition, the informing requirement level may be previously set for each particular situation. A requirement level of terminating the execution of the cruise control in order to inform the driver of the own vehicle of the occurrence of the particular situation having the low informing requirement level is low while the requirement level of terminating the execution of the cruise control in order to inform the driver of the own vehicle of the occurrence of the particular situation having the high informing requirement level is high.

Accordingly, the informing control can be executed, depending on the requirement level of terminating the execution of the cruise control in order to inform the driver of the own vehicle of the occurrence of the particular situation while the aforementioned driver's misunderstanding can be prevented from being led. As a result, the informing of the occurrence of the particular situation can be suitably performed, depending on a necessity for informing the driver of the own vehicle of the occurrence of the particular situation.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

BRIEF DESCRIPTION OF THE DRAWINGS

FIG. 3 is a view used for describing a cruise control and an informing control executed by the vehicle control apparatus shown in FIG. 1.

FIG. 7A is a view used for describing the cruise control and the informing control executed by the CPU of the vehicle control ECU of the vehicle control apparatus according to a first modified example the embodiment.

FIG. 7B is a view used for describing the cruise control and the informing control executed by the CPU of the vehicle control ECU of the vehicle control apparatus according to the first modified example.

FIG. 9 is a view used for describing the cruise control and the informing control executed by the CPU of the vehicle control ECU of the vehicle control apparatus according to a second modified example of the embodiment.

FIG. 11A is a view used for describing the cruise control and the informing control executed by the CPU of the vehicle control ECU of the vehicle control apparatus according to a third modified example of the embodiment.

FIG. 11B is a view used for describing the cruise control and the informing control executed by the CPU of the vehicle control ECU of the vehicle control apparatus according to the third modified example.

FIG. 12A is a view used for describing the cruise control and the informing control executed by the CPU of the vehicle control ECU of the vehicle control apparatus according to a fourth modified example of the embodiment.

FIG. 12B is a view used for describing the cruise control and the informing control executed by the CPU of the vehicle control ECU of the vehicle control apparatus according to the fourth modified example.

DESCRIPTION OF THE PREFERRED EMBODIMENTS

Below, a vehicle control apparatus according to an embodiment of the present invention will be described with reference to the drawings. Hereinafter, the vehicle control apparatus according to the embodiment of the present invention will be referred to as "the embodiment control apparatus".

Figure 1:
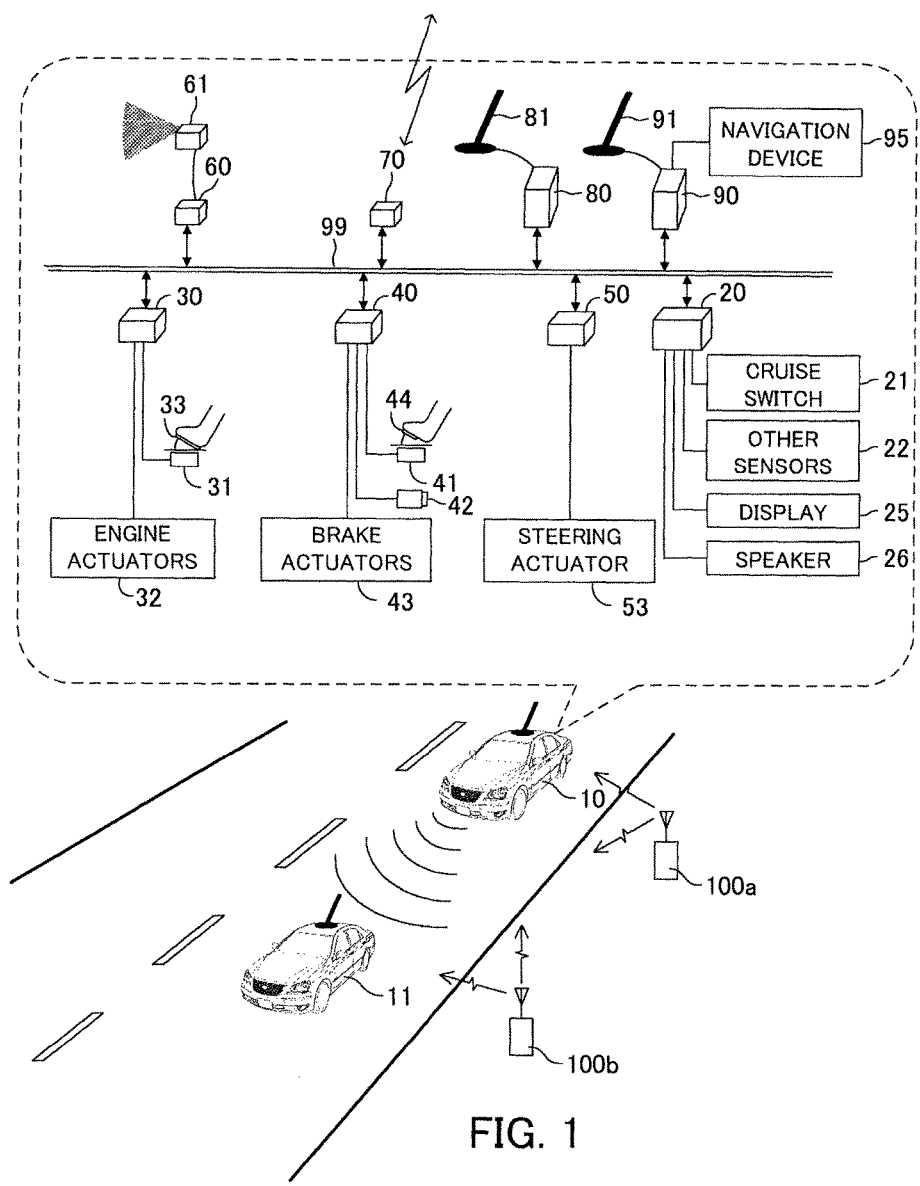
FIG. 1 is a general configuration view for showing a vehicle control apparatus according to an embodiment of the present invention and a vehicle, to which the vehicle control apparatus is applied.

As shown in FIG. 1, the embodiment control apparatus is applied to a vehicle 10. Hereinafter, in some cases, the vehicle 10 will be referred to as "the own vehicle 10". The embodiment control apparatus comprises a vehicle control ECU 20, an engine control ECU 30, an acceleration pedal operation amount sensor 31, a brake control ECU 40, a brake pedal operation amount sensor 41, a vehicle speed sensor 42, a steering control ECU 50, a sensor ECU 60, a radar sensor 61, a GPS device 70, a wireless communication control ECU 80, a wireless antenna 81, a navigation ECU 90 and a wireless antenna 91. A vehicle 11 traveling in front of the own vehicle 10 comprises same components as the components of the own vehicle 10. Hereinafter, the vehicle 11 traveling in front of the own vehicle 10 will be referred to as "the preceding vehicle 11".

The vehicle control ECU 20 is configured to receive and send data from and to the engine control ECU 30, the brake control ECU 40, the steering control ECU 50, the sensor ECU 60, the GPS device 70, the wireless communication ECU 80 and the navigation ECU 90 through a communication/sensor system CAN (i.e., a communication/sensor system Controller Area Network) 99. In other words, the vehicle control ECU 20 is configured to communicate with the engine control ECU 30, the brake control ECU 40, the steering control ECU 50, the sensor ECU 60, the GPS device 70, the wireless communication ECU 80 and the navigation ECU 90 through the communication/sensor system CAN 99. Each of the ECUs is an electric control unit which is an electronic control circuit including a microcomputer as a main component part including a CPU, a ROM, a RAM, an interface and the like. The CPU realizes various functions described later by executing instructions or programs stored in the ROM (i.e. a memory).

The vehicle control ECU 20 is electrically connected to a cruise control request switch 21 and various sensors 22 other than sensors described later. The cruise control request switch 21 is, for example, a lever-type switch. When the cruise control request switch 21 is operated without a cruise control described later (in this embodiment, an ACC control described later) being executed, a start of an execution of the cruise control is requested to the vehicle control ECU 20. On the other hand, when the cruise control request switch 21 is operated in a particular manner with the cruise control being executed, the termination of the execution of the cruise control is requested to the vehicle control ECU 20. Hereinafter, the cruise control request switch 21 will be referred to as "the cruise switch 21".

The cruise control according to the present invention includes following controls (1) to (3).

(1) A cooperative following travel control (CACC: Cooperative Adaptive Cruise Control).

(2) A following travel control or an inter-vehicle distance control (ACC: Adaptive Cruise Control).

(3) A constant vehicle speed travel control (CC: Cruise Control).

The vehicle control ECU 20 is electrically connected to a display 25 and a speaker 26. The display 25 is provided at a position where a driver of the own vehicle 10 can see when the driver drives the own vehicle 10. The display 25 displays a particular situation or situations by characters and/or graphic. The display 25 is, for example, a combination meter for displaying various meters or a head-up display for displaying an image or images on a front windshield or a hybrid system indicator of a hybrid vehicle.

The engine control ECU 30 is known. The engine control ECU 30 acquires detection signals from sensors (not shown) for detecting various operation state amounts of an internal combustion engine (not shown) of the own vehicle 10, respectively. In particular, the engine control ECU 30 is electrically connected to the acceleration pedal operation amount sensor 31.

The acceleration pedal operation amount sensor 31 detects an amount Accp of an operation of an acceleration pedal 33 as an acceleration operator and outputs a detection signal representing the amount Accp to the engine control ECU 30. Hereinafter, the amount Accp will be referred to as "the acceleration pedal operation amount Accp".

Engine actuators 32 including a throttle valve actuator (not shown) are electrically connected to the engine control ECU 30. The engine control ECU 30 activates the engine actuators 32 to change a torque generated by the internal combustion engine of the own vehicle 10, thereby to control a traveling speed and an acceleration of the own vehicle 10.

The brake control ECU 40 is electrically connected to the brake pedal operation amount sensor 41, the vehicle speed sensor 42 and sensors (not shown) used for a braking control. The brake control ECU 40 receives detection signals from these sensors.

The brake pedal operation amount sensor 41 detects an amount Brkp of an operation of a brake pedal 44 as a brake operator and outputs a detection signal representing the amount Brkp to the brake control ECU 40. Hereinafter, the amount Brkp will be referred to as "the brake pedal operation amount Brkp". The vehicle speed sensor 42 detects a traveling speed SPDj of the own vehicle 10 and outputs a detection signal representing the traveling speed SPDj to the brake control ECU 40. Hereinafter, the traveling speed SPDj will be referred to as "the own vehicle speed SPDj".

Brake actuators 43 of a friction braking device (not shown) and the like are electrically connected to the brake control ECU 40. The brake control ECU 40 activates the brake actuators 43 to generate friction forces at vehicle wheels of the own vehicle 10, respectively, thereby to control the own vehicle speed SPDj and the acceleration (in particular, a deceleration) of the own vehicle 10.

The steering control ECU 50 acquires detection signals from sensors (not shown) for detecting various traveling state amounts of the own vehicle 10, respectively. A steering actuator 53 such as a motor of an electric power steering device (not shown) is electrically connected to the steering control ECU 50.

The sensor ECU 60 is electrically connected to the radar sensor 61. The radar sensor 61 is a known millimeter wave radar sensor. The radar sensor 61 sends a millimeter wave or an output wave ahead of the own vehicle 10. The millimeter wave is reflected by the preceding vehicle 11. The radar sensor 61 receives the reflected millimeter wave.

The sensor ECU 60 detects the preceding vehicle 11 traveling within a predetermined distance from the own vehicle 10 on the basis of the reflected millimeter wave received by the radar sensor 61. In addition, the sensor ECU 60 acquires a difference ΔSPD or a relative speed ΔSPD between the own vehicle speed SPDj and a traveling speed SPDs of the preceding vehicle 11 (ΔSPD=SPDs−SPDj), an inter-vehicle distance D between the own vehicle 10 and the preceding vehicle 11 and the like on the basis of a phase difference between the millimeter wave sent from the radar sensor 61 and the received reflected millimeter wave, an attenuation level of the reflected millimeter wave, a detection time of the reflected millimeter wave and the like in chronological order each time a predetermined time elapses. The sensor ECU 60 and the radar sensor 61 constitutes an inter-vehicle distance detection device.

The GPS device 70 is known. The GPS device 70 acquires a latitude and a longitude of a position Pj of the own vehicle 10, that is, an own vehicle position Pj on the basis of a GPS signal sent from an artificial satellite.

The wireless communication control ECU 80 is electrically connected to the wireless antenna 81 which performs a wireless communication or a road-to-vehicle communication with roadside communication devices installed along roads. The wireless communication control ECU 80 also performs the wireless communication or a vehicle-to-vehicle communication with the other vehicles with the wireless antenna 81.

The wireless communication control ECU 80 receives or acquires information on a vehicle traffic including road situation information on a road situation sent from radio wave roadside communication devices 100a provided outside of the own vehicle 10 through the wireless antenna 81 and stores the received or acquired information in the RAM of the wireless communication control ECU 80. Hereinafter, the information on the vehicle traffic will be referred to as "the infrastructure information". Concrete examples of the infrastructure information will be described in combination of a description of the navigation ECU 90 described later.

The navigation ECU 90 is electrically connected to the wireless antenna 91 and a navigation device 95. The navigation ECU 90 receives or acquires the infrastructure information sent from optical beacon roadside devices 100b through the wireless antenna 91 and stores the received or acquired infrastructure information in the RAM of the navigation ECU 90.

The infrastructure information acquired by the navigation ECU 90 and the wireless communication ECU 80 includes at least information A1 to A4 described with reference to FIGS. 2A and 2B.

(A1) Information on a present lighting state (a green signal lighting state, a yellow signal lighting state and a red signal lighting state) of each of traffic lights 101a to 101d around the own vehicle 10, information on a lighting cycle of each of the traffic lights 101a to 101d and the like.

Figure 2A:
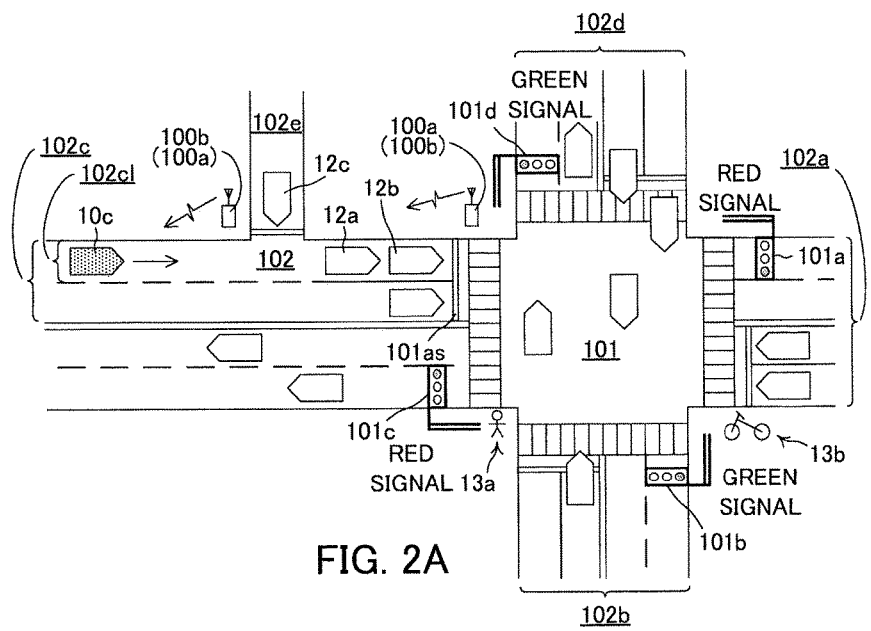
FIG. 2A is a view for showing a crossroad intersection and an area around the crossroad intersection.

(A2) Information on a lane where each of the other vehicles 12a and 12b around the own vehicle 10 travels, information on a position of each of the other vehicles 12a to 12c, information on a traveling speed of each of the other vehicles 12a to 12c (see FIG. 2A).

(A3) Pedestrian/bicycle information on pedestrians 13a and bicycles 13b around the own vehicle 10 (see FIG. 2A).

Figure 2B:
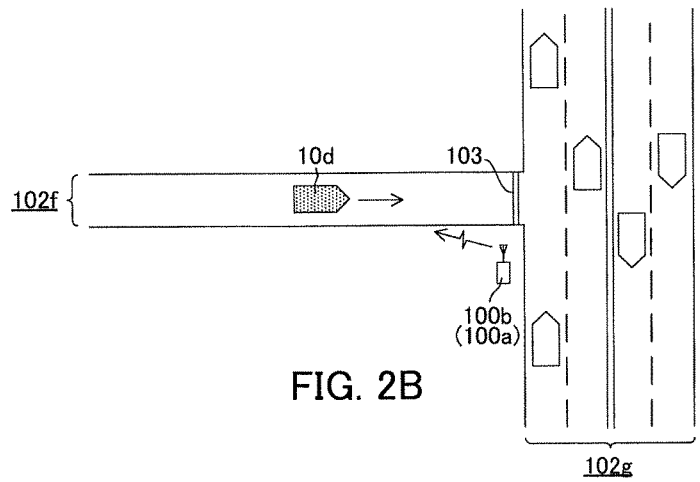
FIG. 2B is a view for showing a T-shaped intersection and an area around the T-shaped intersection.

(A4) Information on a shape of each of roads 102a to 102g around the own vehicle 10, information on a position of a momentary stop line 103 provided on a road around the own vehicle 10 and the like (see FIGS. 2A and 2B).

The navigation ECU 90 acquires an own vehicle information including the own vehicle position Pj, an own vehicle traveling direction θj corresponding to a traveling direction of the own vehicle 10 and the like from the GPS device 70. As is known, the navigation ECU 90 causes the navigation device 95 to display information on a traveling route to a destination and the like on the basis of the acquired infrastructure information, acquired route information, the own vehicle information and the like.

Summary of Particular Situation Informing Control

Next, a summary of a particular situation informing control executed by the embodiment control apparatus will be described. When a particular situation where a driver of the own vehicle 10 should be alerted occurs, the vehicle control ECU 20 of the embodiment control apparatus executes a particular situation informing control for performing a particular situation informing for informing the driver of the own vehicle 10 of an occurrence of the particular situation by the display 25 and the speaker 26.

In particular, the vehicle control ECU 20 acquires the infrastructure information from the wireless communication ECU 80 and the navigation ECU 90 through the CAN 99. In addition, the vehicle control ECU 20 acquires the own vehicle position Pj from the GPS device 70 through the CAN 99 and acquires the own vehicle speed SPDj from the brake control ECU 40 through the CAN 99.

The vehicle control ECU 20 determines whether or not any of following objects B1 to B4 exists on the basis of the acquired infrastructure information. The own vehicle 10 is requested to stop when at least one of the objects B1 to B4 exists.

Object B1: The traffic light 101a installed at the intersection 101 at which the own vehicle 10c will arrive first after the present time, the traffic light 101a regulating the traveling of the own vehicle 10c and being predicted to light the red signal when the own vehicle 10c arrives at a stop line 101*as* provided corresponding to the traffic light 101*a* and defining a stop position of the own vehicle 10*c* (see FIG. 2A). It should be noted that a timing that the own vehicle 10*c* arrives at the stop line 101 as is estimated on the basis of the present time, a distance between the own vehicle 10*c* and the stop line 101 as, the own vehicle speed SPDj and the like. The distance between the own vehicle 10*c* and the stop line 101*as* is calculated on the basis of the own vehicle position Pj and a position of the stop line 101*as*.

Object B2: The momentary stop line 103 at which the own vehicle 10*d* will arrive first after the present time (see FIG. 2B).

Object B3: The other vehicles 12*a* and 12*b* which stop in a lane 102*cl*, along which the own vehicle 10 travels, and exist in the traveling direction of the own vehicle 10 (see FIG. 2A).

Object B4: The other vehicle 12*c* which is predicted to move from a non-priority road 102*e*, i.e., a side street 102*e* into a priority road 102*c*, along which the own vehicle 10*c* travels, at a T-shape intersection 102.

The vehicle control ECU 20 calculates a required time T by dividing a distance Dobj between the own vehicle 10 and each of the objects B1 to B4 by the own vehicle speed SPDj (T=Dobj/SPDj).

When the required time T is equal to or smaller than a threshold time Tth, that is, when it is predicted that the own vehicle 10 reaches any of the objects B1 to B4 within the threshold time Tth, the vehicle control ECU 20 determines that the particular situation occurs. Thus, the vehicle control ECU 20 starts to execute the particular situation informing control to perform the particular situation informing for informing the driver of the own vehicle 10 of the occurrence of the particular situation by the display 25 and the speaker 26.

Adjustment to Cruise Control

There is known the cruise control for automatically controlling the acceleration of the own vehicle 10 to travel the own vehicle 10 such that the inter-vehicle distance D between the own vehicle 10 and the preceding vehicle 11 is maintained at a set inter-vehicle distance or a target inter-vehicle distance Dtgt without a driver's operation of the acceleration pedal 33 or the brake pedal 44.

In this embodiment, when the preceding vehicle 11 exists, the inter-vehicle distance control (i.e., ACC) is executed. On the other hand, when the preceding vehicle 11 does not exist, the constant vehicle speed travel control (i.e., CC) is executed.

The particular situation may occur during the execution of the cruise control. When the particular situation occurs and thus, the execution of the particular situation informing control is started with the cruise control being executed, the own vehicle 10 may be accelerated and decelerated by the cruise control with the particular situation informing control being executed. In this case, the driver of the own vehicle 10 may misunderstand that the own vehicle 10 is caused to travel suitably by the cruise control in consideration of the particular situation.

Accordingly, as shown in a box (a) of FIG. 3, when both an execution condition of the cruise control and an execution condition of the particular situation informing control are satisfied and a requested acceleration Gj of the own vehicle 10 calculated in the cruise control is not equal to or smaller than a minute positive value α (i.e., the requested acceleration Gj is not substantially zero), that is, the own vehicle 10 is not accelerated nor decelerated by the cruise control, the embodiment control apparatus permits the execution of the cruise control and forbids the execution of the particular situation informing control. Thereby, the driver of the own vehicle 10 is not informed of the occurrence of the particular situation. Thus, even when the own vehicle 10 is accelerated or decelerated by the cruise control, the aforementioned driver's misunderstanding is not led. Hereinafter, the execution condition of the cruise control will be referred to as "the cruise condition" and the execution condition of the particular situation informing control will be referred to as "the informing condition". Further, hereinafter, the particular situation informing control will be simply referred to as "the informing control".

In this embodiment, the case that both the cruise condition and the informing condition are satisfied includes a case that both the cruise and informing conditions are satisfied independently of a timing of a satisfaction of the cruise condition and a timing of a satisfaction of the informing condition.

On the other hand, as shown in a box (b) of FIG. 3, when both the cruise condition and the informing condition are satisfied and the requested acceleration Gj is substantially zero, that is, the own vehicle 10 is not accelerated nor decelerated by the cruise control and thus, a constant vehicle speed traveling of the own vehicle 10 is requested, the embodiment control apparatus permits both the execution of the cruise control and the execution of the informing control. Thereby, the driver of the own vehicle 10 is informed of the occurrence of the particular situation. However, the own vehicle 10 is not accelerated nor decelerated by the cruise control. Thus, the aforementioned driver's misunderstanding derived from the simultaneous performance of the informing of the occurrence of the particular situation and the acceleration or deceleration of the own vehicle 10 can be prevented from being led.

The summary of the operation of the embodiment control apparatus has been described. According to the operation of the embodiment control apparatus, when both the cruise condition and the informing condition are satisfied and the own vehicle 10 is accelerated or decelerated by the cruise control, the execution of the informing control is forbidden and the execution of the cruise control is permitted (see the box (a) of FIG. 3). On the other hand, when both the cruise condition and the informing condition are satisfied and the own vehicle 10 is not accelerated nor decelerated by the cruise control, both the execution of the informing control and the execution of the cruise control are permitted (see the box (b) of FIG. 3). A above-described process executed by the embodiment control apparatus is a first adjustment process. According to this first adjustment process, the driver of the own vehicle 10 can be informed of the occurrence of the particular situation while the aforementioned driver's misunderstanding derived from the simultaneous performance of the informing of the occurrence of the particular situation by the informing control and the acceleration or deceleration of the own vehicle 10 by the cruise control which the driver can feel can be prevented from being led.

Concrete Operation of Embodiment Control Apparatus

Next, a concrete operation of the embodiment control apparatus will be described. The CPU of the vehicle control ECU 20 of the embodiment control apparatus is configured or programmed to start a routine shown by a flowchart in FIG. 4 each time a predetermined time elapses. Hereinafter, the CPU of the vehicle control ECU 20 will be simply referred to as "the CPU".

At a predetermined timing, the CPU starts a process from a step 400 and then, proceeds with the process to a step 405 to determine whether or not both the cruise and informing conditions are satisfied.

The cruise condition becomes satisfied when a cruise control start operation including a cruise control restart operation of the cruise switch 22 is performed without the cruise control being executed. On the other hand, the cruise condition becomes unsatisfied when a cruise control stop operation of the cruise switch 22 is performed or the brake pedal operation amount Brkp becomes larger than zero with the cruise control being executed.

The informing condition becomes satisfied when it is determined that the particular situation occurs. On the other hand, the informing condition becomes unsatisfied when it is not determined that the particular situation occurs. When the required time T (=Dobj/SPDj) is equal to or smaller than the threshold time Tth, the CPU determines that the particular situation occurs. On the other hand, when the required time T is larger than the threshold time Tth, the CPU does not determines that the particular situation occurs.

When the cruise control is not executed, the engine control ECU 30 controls the engine actuators 32 on the basis of the acceleration pedal operation amount Accp, an engine speed, which is a rotation speed of the internal combustion engine and the like and the brake control ECU 40 controls the brake actuators 43 on the basis of the brake pedal operation amount Brkp, the own vehicle speed SPDj (or vehicle wheel rotation speed of each vehicle wheel of the own vehicle 10) and the like.

Figure 5:
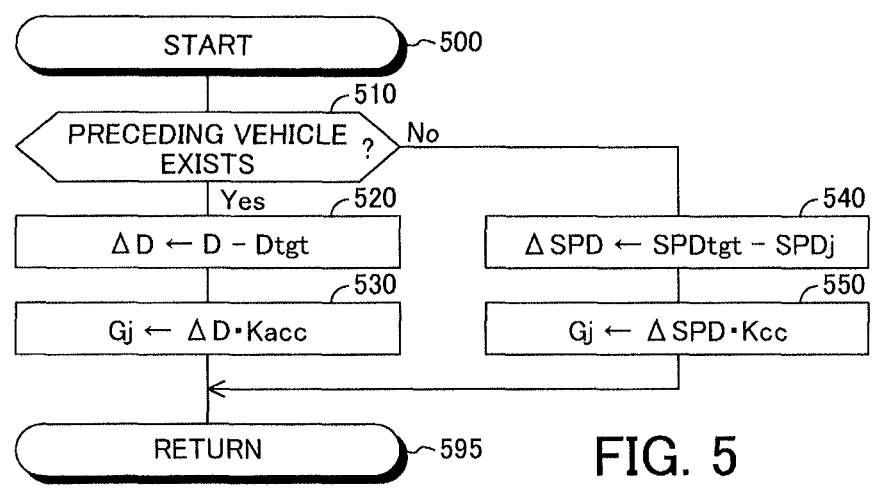
FIG. 5 is a flowchart for showing a routine executed by the CPU.

When both the cruise and informing conditions are satisfied upon the execution of the process of the step 405, the CPU determines "Yes" at the step 405 and then, proceeds with the process to a step 410 to execute a routine shown by a flowchart in FIG. 5 to calculate the requested acceleration Gj of the own vehicle 10.

Therefore, when the CPU proceeds with the process to the step 410, the CPU starts a process from a step 500 of FIG. 5 and then, proceeds with the process to a step 510 to determine whether or not the preceding vehicle 11 exists. When the preceding vehicle 11 exists, the CPU determines "Yes" at the step 510 and then, sequentially executes processes of steps 520 and 530 described below. Then, the CPU proceeds with the process to a step 415 of FIG. 4 via a step 595.

Step 520: The CPU calculates a difference ΔD between the present inter-vehicle distance D and the set inter-vehicle distance Dtgt (ΔD=D−Dtgt). The calculated difference ΔD is a positive value when the present inter-vehicle distance D is larger than the set inter-vehicle distance Dtgt. On the other hand, the calculated difference ΔD is a negative value when the present inter-vehicle distance D is smaller than the set inter-vehicle distance Dtgt. Hereinafter, the difference ΔD will be referred to as "the inter-vehicle distance difference ΔD".

Step 530: The CPU calculates the requested acceleration Gj necessary for causing the inter-vehicle distance D to correspond to the set inter-vehicle distance Dtgt by multiplying the inter-vehicle distance difference ΔD by a predetermined correction coefficient Kacc. When the inter-vehicle distance difference ΔD is a positive value, a value equal to or smaller than "1" is used as the predetermined correction coefficient Kacc. On the other hand, the inter-vehicle distance difference ΔD is a negative value, a value of "1" is used as the predetermined correction coefficient Kacc. The set inter-vehicle distance Dtgt may be previously set as a constant value or may be optionally set by the driver of the own vehicle 10.

When the preceding vehicle 11 does not exist upon the execution of the process of the step 510, the CPU determines "No" at the step 510 and then, sequentially executes processes of steps 540 and 550 described below. Then, the CPU proceeds with the process to the step 415 of FIG. 4 via the step 595.

Step 540: The CPU calculates a difference ΔSPD between the own vehicle speed SPDj and a separately set vehicle speed SPDtgt (ΔSPD=SPDtgt−SPDj). When the own vehicle speed SPDj is smaller than the set vehicle speed SPDtgt, the calculated difference ΔSPD is a positive value. On the other hand, when the own vehicle speed SPDj is larger than the set vehicle speed SPDtgt, the calculated difference ΔSPD is a negative value. Hereinafter, the difference ΔSPD will be referred to as "the vehicle speed difference ΔSPD".

Step 550: The CPU calculates the requested acceleration Gj necessary for causing the own vehicle speed SPDj to correspond to the set vehicle speed SPDtgt by multiplying the vehicle speed difference ΔSPD calculated at the step 540 by a predetermined correction coefficient Kcc. In this embodiment, the own vehicle speed SPDj when the cruise condition becomes satisfied, is set as the set vehicle speed SPDtgt. Alternatively, the set vehicle speed SPDtgt may be changed by an operation of a lever (not shown) by the driver of the own vehicle 10 during the execution of the cruise control. When an operation for restarting or resuming the execution of the cruise control is performed by the cruise switch 22, the set vehicle speed SPDtgt which was set during the last time execution of the cruise control is set as the this time set vehicle speed SPDtgt.

Figure 4:
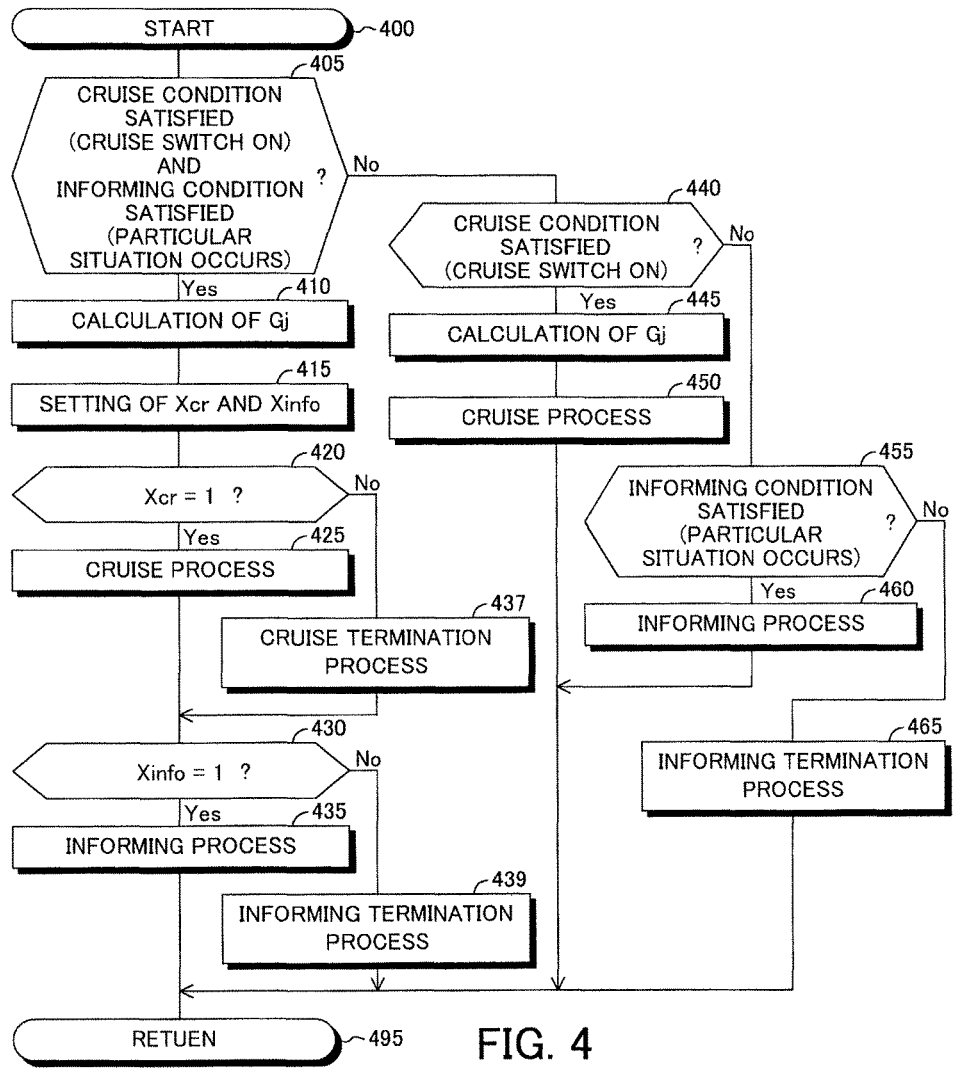
FIG. 4 is a flowchart for showing a routine executed by a CPU of a vehicle control ECU shown in FIG. 1.
Figure 6:
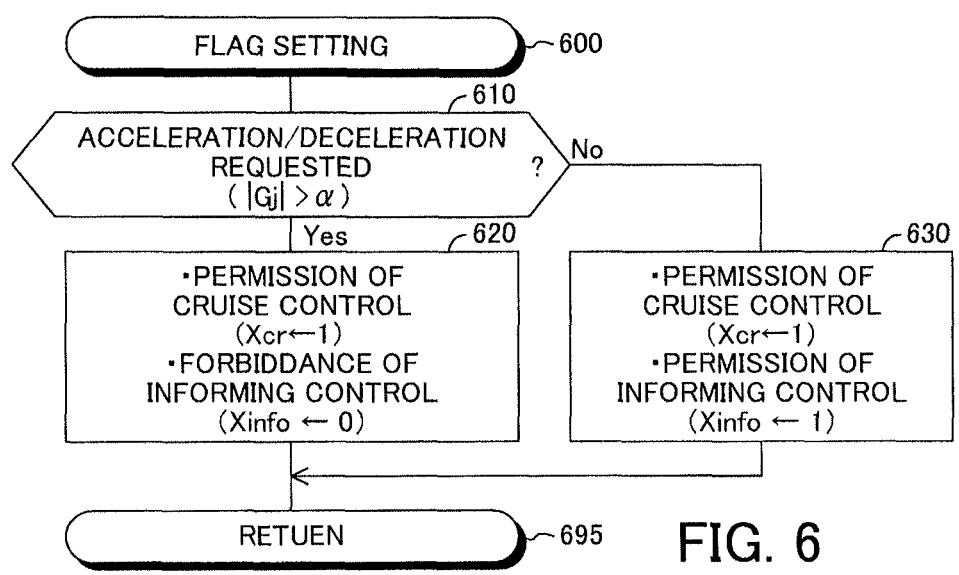
FIG. 6 is a flowchart for showing a routine executed by the CPU.

When the CPU proceeds with the process to the step 415 of FIG. 4, the CPU starts to execute a routine shown by a flowchart in FIG. 6 to set a cruise permission flag Xcr and an informing permission flag Xinfo. Therefore, when the CPU proceeds with the process to the step 415, the CPU starts a process from a step 600 of FIG. 6 and then, proceeds with the process to a step 610 to determine whether or not an absolute value of the requested acceleration Gj calculated at the step 410 of FIG. 4 is larger than a predetermined threshold α set as a positive value larger than "0", that is, whether or not the acceleration or deceleration of the own vehicle 10 which the driver of the own vehicle 10 can feel occurs.

When the absolute value of the requested acceleration Gj is larger than the predetermined threshold α, that is, when the acceleration or deceleration of the own vehicle 10 is requested, the CPU determines "Yes" at the step 610 and then, proceeds with the process to a step 620 to set a value of the cruise permission flag Xcr to "1" and a value of the informing permission flag Xinfo to "0". Then, the CPU proceeds with the process to a step 420 of FIG. 4 via a step 695. In this case, the cruise control is executed to accelerate or decelerate the own vehicle 10 and the informing control is forbidden by processes of steps 425 and 439.

On the other hand, when the absolute value of the requested acceleration Gj is equal to or smaller than the predetermined threshold α upon the execution of the process of the step 610 of FIG. 6, that is, when the constant vehicle speed traveling of the own vehicle 10 is requested and thus, the own vehicle 10 travels at a constant vehicle speed, the CPU determines "No" at the step 610 and then, proceeds with the process to a step 630 to set both the cruise permission flag Xcr and the informing permission flag Xinfo to "1", respectively. Then, the CPU proceeds with the process to the step 420 of FIG. 4 via the step 695. In this case, the informing control is executed and the cruise control is executed to cause the own vehicle 10 to travel at the constant vehicle speed by the process of the step 425 of FIG. 4 and a process of a step 435 of FIG. 4.

When the CPU proceeds with the process to the step 420 of FIG. 4, the CPU determines whether or not the value of the cruise permission flag Xcr is "1", that is, whether or not the execution of the cruise control is permitted. When the value of the cruise permission flag Xcr is "1", the CPU determines "Yes" at the step 420 and then, proceeds with the process to the step 425 to execute the cruise control. In particular, the CPU executes processes for activating the engine actuators 32 of the internal combustion engine and the brake actuators 43 of a braking device such that the requested acceleration Gj calculated at the step 410 is achieved, that is, such that the acceleration or deceleration of the own vehicle 10 corresponds to the requested acceleration Gj. Then, the CPU proceeds with the process to a step 430.

Thereby, when the requested acceleration Gj is larger than "0", the own vehicle 10 is accelerated. On the other hand, when the requested acceleration Gj is smaller than "0", the own vehicle 10 is decelerated. As a result, when the preceding vehicle 11 exists, the inter-vehicle distance D is maintained at the set inter-vehicle distance Dtgt. On the other hand, when the preceding vehicle 11 does not exist, the own vehicle speed SPDj is maintained at the set vehicle speed SPDtgt.

When the value of the cruise permission flag Xcr is "0" upon the execution of the process of the step 420, that is, when the execution of the cruise control is forbidden, the CPU determines "No" at the step 420 and then, proceeds with the process to a step 437 to execute a process for terminating the execution of the cruise control. Then, the CPU proceeds with the process to the step 430. Thereby, the cruise condition becomes unsatisfied and as a result, when the CPU proceeds with the process to the step 405, the CPU determines "No" at the step 405 and then, proceeds with the process to a step 440 to determine "No".

When the CPU proceeds with the process to the step 430, the CPU determines whether or not the value of the informing permission flag Xinfo is "1", that is, when the execution of the informing control is permitted. When the value of the informing permission flag Xinfo is "1", the CPU determines "Yes" at the step 430 and then, proceeds with the process to the step 435 to execute the informing control. In particular, the CPU executes processes for activating the display 25 and the speaker 26 to perform the particular situation informing. Then, the CPU proceeds with the process to a step 495 to terminate the execution of this routine once.

On the other hand, when the value of the informing permission flag Xinfo is "0" upon the execution of the process of the step 430, that is, when the execution of the informing control is forbidden, the CPU determines "No" at the step 430 and then, proceeds with the process to the step 439 to execute process for terminating the execution of the informing control if the informing control is executed. Then, the CPU proceeds with the process to the step 495 to terminate the execution of this routine once.

On the other hand, when any one of the cruise and informing conditions is not satisfied upon the execution of the process of the step 405, the CPU determines "No" at the step 405 and then, proceeds with the process to the step 440 to determine whether or not the cruise condition is satisfied. When the cruise condition is satisfied, the CPU determines "Yes" at the step 440 and then, proceeds with the process to a step 445 to calculate the requested acceleration Gj by the routine shown in FIG. 5.

Next, the CPU proceeds with the process to a step 450 to execute the cruise control. In particular, the CPU executes processes for activating the engine actuators 32 and the brake actuators 43 such that the requested acceleration Gj calculated at the step 445 is achieved, that is, such that the acceleration or deceleration of the own vehicle 10 corresponds to the requested acceleration Gj. Then, the CPU proceeds with the process to the step 495 to terminate the execution of this routine once.

On the other hand, when the cruise condition is not satisfied upon the execution of the process of the step 440, the CPU determines "No" at the step 440 and then, proceeds with the process to a step 455 to determine whether or not the informing condition is satisfied.

When the informing condition is satisfied, the CPU determines "Yes" at the step 455 and then, proceeds with the process to a step 460 to execute the informing control. In particular, the CPU executes processes for activating the display 25 and the speaker 26 to perform the particular situation informing. Then, the CPU proceeds with the process to the step 495 to terminate the execution of this routine once.

On the other hand, when the informing condition is not satisfied upon the execution of the process of the step 445, the CPU determines "No" at the step 455 and then, proceeds with the process to a step 465 to execute a process for terminating the informing control if the informing control is executed. Then, the CPU proceeds with the process to the step 495 to terminate the execution of this routine once.

The concrete operation of the embodiment control apparatus has been described. According to the operation of the embodiment control apparatus, when both the cruise and informing conditions are satisfied (see the determination "Yes" at the step 405 of FIG. 4) and the own vehicle 10 is accelerated or decelerated by the cruise control (see the determination "Yes" at the step 610 of FIG. 6), the execution of the informing control is forbidden and the execution of the cruise control is permitted (see the step 620).

On the other hand, when both the cruise and informing conditions are satisfied and the own vehicle 10 is not accelerated nor decelerated by the cruise control (see the determination "No" at the step 610 of FIG. 6), both the execution of the informing control and the execution of the cruise control are permitted (see the step 630). Therefore, the driver of the own vehicle 10 can be informed of the occurrence of the particular situation while the aforementioned driver's misunderstanding derived from the simultaneous performance of the informing of the occurrence of the particular situation and the acceleration or deceleration of the own vehicle 10 can be prevented from being led.

First Modified Example

The embodiment control apparatus terminates or forbids the particular situation informing and permits the acceleration or deceleration of the own vehicle 10 performed by the cruise control when the acceleration or deceleration performed by the cruise control is requested with the particular situation informing being performed. However, in this case, the acceleration or deceleration of the own vehicle 10 starts immediately after the particular situation informing is terminated. Therefore, although the particular situation informing and the acceleration or deceleration of the own vehicle 10 are not performed simultaneously, the driver of the own vehicle 10 may misunderstand that the cruise control has been executed in consideration of the particular situation.

As shown in a box (c) of FIG. 7A, when the cruise condition becomes satisfied before the informing condition becomes satisfied and the absolute value of the requested acceleration Gj is larger than the predetermined threshold α, that is, the acceleration or deceleration of the own vehicle 10 performed by the cruise control which the driver of the own vehicle 10 can feel is requested with both the cruise and informing conditions being satisfied, the vehicle control apparatus according to a first modified example of the embodiment permits the execution of the cruise control and forbids the execution of the informing control (the first adjustment process), similar to the embodiment control apparatus. Hereinafter, the vehicle control apparatus according to the first modified example will be referred to as "the first control apparatus".

On the other hand, as shown in a box (d) of FIG. 7, when the cruise condition becomes satisfied before the informing condition becomes satisfied and the absolute value of the requested acceleration Gj is equal to or smaller than the predetermined threshold α, that is, the constant vehicle speed traveling of the own vehicle 10 performed by the cruise control is requested with both the cruise and informing conditions being satisfied, the first control apparatus permits both the execution of the cruise control and the execution of the informing control, similar to the embodiment control apparatus.

As shown in a box (e) of FIG. 7B, when both the cruise and informing conditions are satisfied with the informing condition becoming satisfied before the cruise condition becomes satisfied, the first control apparatus forbids the execution of the cruise control and permits the execution of the informing control, independently of the requested acceleration Gj (a second adjustment process).

Thereby, when the informing condition becomes satisfied before the cruise condition becomes satisfied and as a result, the particular situation informing is performed, the particular situation informing continues and the execution of the cruise control does not start (see the box (e) of FIG. 7B). Therefore, the aforementioned driver's misunderstanding derived from the acceleration or deceleration of the own vehicle 10 by the cruise control which the driver can feel immediately after the termination of the particular situation informing can be surely prevented from being led.

Next, a concrete operation of the first control apparatus will be described. When the CPU of the vehicle control ECU 20 of the first control apparatus proceeds with the process to the step 415 of FIG. 4, the CPU is configured or programmed to execute a routine shown by a flowchart in FIG. 8 in place of the routine of FIG. 6 to set the cruise permission flag Xcr and the informing permission flag Xinfo.

Figure 8:
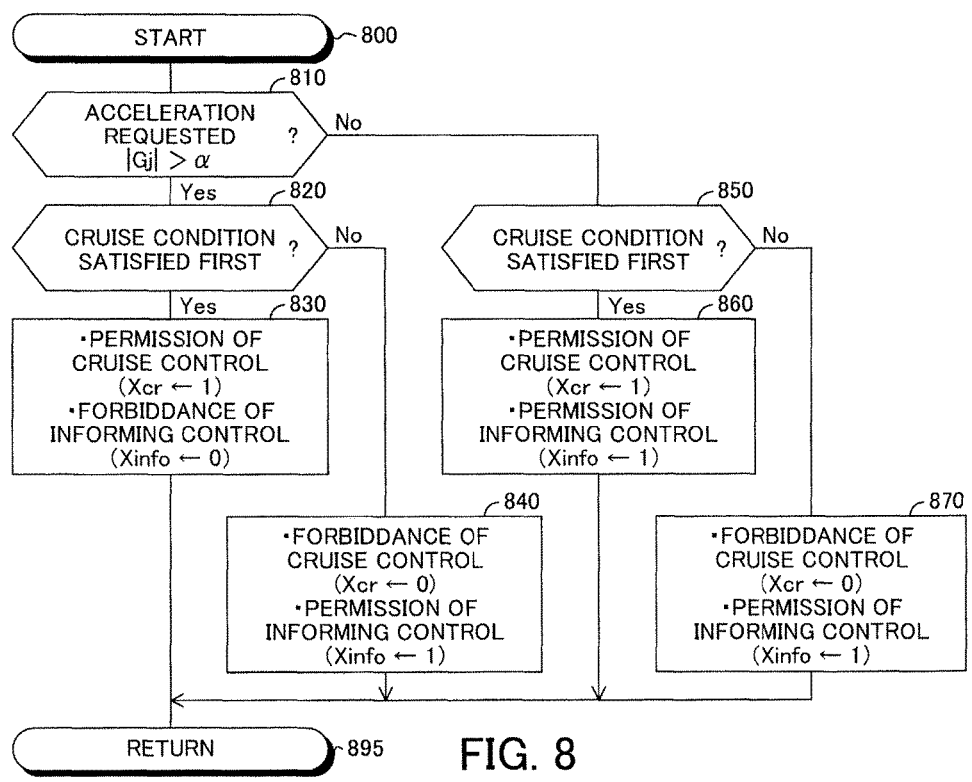
FIG. 8 is a flowchart for showing a routine executed by the CPU of the vehicle control ECU of the vehicle control apparatus according to the first modified example.

When the CPU proceeds with the process to the step 415 of FIG. 4, the CPU starts a process from a step 800 of FIG. 8 and then, proceeds with the process to a step 810 to determine whether or not the absolute value of the requested acceleration Gj calculated at the step 410 of FIG. 4 is larger than the predetermined threshold α.

When the absolute value of the requested acceleration Gj is larger than the predetermined threshold α and thus, the own vehicle 10 is accelerated or decelerated, the CPU determines "Yes" at the step 810 and then, proceeds with the process to a step 820 to determines whether or not the cruise condition becomes satisfied before the informing condition becomes satisfied, that is, whether or not the cruise control has been executed.

When the cruise condition becomes satisfied before the informing condition becomes satisfied, that is, when the cruise control has been executed, the CPU determines "Yes" at the 820 and then, proceeds with the process to a step 830 to set the value of the cruise permission flag Xcr to "1" and the value of the informing permission flag Xinfo to "0". Then, the CPU proceeds with the process to the step 420 of FIG. 4 via a step 895. In this case, the own vehicle 10 is accelerated or decelerated by the cruise control with the execution of the informing control being terminated by the processes of the steps 425 and 439 of FIG. 4.

On the other hand, when the informing condition becomes satisfied before the cruise condition becomes satisfied upon the execution of the process of the step 820 of FIG. 8, that is, when the informing control has been executed, the CPU determines "No" at the step 820 and then, proceeds with the process to a step 840 to set the value of the cruise permission flag Xcr to "0" and the value of the informing permission flag Xinfo to "1". Then, the CPU proceeds with process to the step 420 of FIG. 4 via the step 895. In this case, the execution of the informing control continues without starting the execution of the cruise control by the processes of the steps 435 and 437 of FIG. 4.

On the other hand, when the absolute value of the requested acceleration Gj is equal to or smaller than the predetermined threshold α upon the execution of the process of the step 810, that is, when the constant vehicle speed traveling of the own vehicle 10 is requested, the CPU determines "No" at the step 810 and then, proceeds with the process to a step 850 to determine whether or not the cruise control becomes satisfied before the informing condition becomes satisfied, that is, whether or not the cruise control has been executed.

When the cruise condition becomes satisfied before the informing condition becomes satisfied, that is, when the cruise control has been executed, the CPU determines "Yes" at the step 850 and then, proceeds with the process to a step 860 to set the values of the cruise permission flag Xcr and the informing permission flag Xinfo to "1", respectively. Then, the CPU proceeds with the process to the step 420 of FIG. 4 via the step 895. In this case, the cruise control is executed to cause the own vehicle 10 to travel at the constant vehicle speed with the informing control having been executed by the processes of the steps 425 and 435 of FIG. 4.

On the other hand, when the informing condition becomes satisfied before the cruise condition becomes satisfied upon the execution of the process of the step 850, that is, when the informing control has been executed, the CPU determines "No" at the step 850 and then, proceeds with the process to a step 870 to set the value of the cruise permission flag Xcr to "0" and the value of the informing permission flag Xinfo to "1". Then, the CPU proceeds with the process to the step 420 of FIG. 4 via the step 895. In this case, the execution of the informing control continues without starting the execution of the cruise control by the processes of the steps 435 and 437 of FIG. 4.

Thereby, when the informing condition becomes satisfied before the cruise control becomes satisfied (see the determinations "No" at the steps 820 and 850, respectively) and as a result, the informing control has been executed, the execution of the cruise control does not start (see the steps 840 and 870).

Second Modified Example

As described above, it is important for informing the driver of the own vehicle 10 of the occurrence of the particular situation that the traffic light 101a, at which the own vehicle 10 is predicted to arrive within the threshold time Tth, lights the red signal. In other words, when such a particular situation occurs, a level of a requirement of informing the driver of the own vehicle 10 to alert the driver is relatively high. Hereinafter, the level of the requirement will be referred to as "the informing requirement level".

On the other hand, as shown in FIG. 2A, when the other vehicle 12c travels along the non-priority road 102e connected to the priority road 102c along which the own vehicle 10 travels and may move from the non-priority road 102e to the priority road 102c, the embodiment control apparatus determines that the particular situation occurs. In this regards, it is predicted that the other vehicle 12c moves into the priority road 102c after the other vehicle 12c stops temporarily before the other vehicle 12c moves into the 102c and then, a driver of the other vehicle 12c sufficiently confirms vehicles traveling along the priority road 102c. Therefore, the level of the requirement of informing the driver of the own vehicle 10 of the occurrence of the particular situation to alert the driver of the own vehicle 10, that is, the informing requirement level is relatively low.

As described above, in the embodiment, there are the particular situation where the informing requirement level is relatively high and the particular situation where the informing requirement level is relatively low. The informing requirement levels are set for the particular situations, respectively. For example, the high informing requirement level is set for the particular situation where the required time T regarding the traffic light 101a as the object B1 becomes equal to or smaller than the threshold time Tth and the particular situation where the required time T regarding the momentary stop line 103 as the object B2 becomes equal to or smaller than the threshold time Tth, respectively. On the other hand, the low informing requirement levels are set for the particular situation where the required time T regarding the other vehicle 12a as the object B3 becomes equal to or smaller than the threshold time Tth and the particular situation where the required time T regarding the other vehicle 12c as the object B4 becomes equal to or smaller than the threshold time Tth, respectively. In the case that the informing requirement levels are set as described above, when both the cruise and informing conditions are satisfied, it is preferred to determine whether any of the cruise control and the informing control should be executed or both the cruise control and the informing control should be executed, depending on the informing requirement level of each particular situation.

Accordingly, as shown in a box (f) of FIG. 9, when both the cruise and informing conditions are satisfied and the informing requirement level of the particular situation causing the informing condition to be satisfied is high, the vehicle control apparatus according to a second modified example of the embodiment forbids the execution of the cruise control and permit the execution of the informing control, independently of whether or not the acceleration or deceleration of the own vehicle 10 which the driver of the own vehicle 10 can feel is requested by the cruise control. Hereinafter, the vehicle control apparatus according to the second embodiment will be referred to as "the second control apparatus".

On the other hand, as shown in a box (g) of FIG. 9, when the informing requirement level of the particular situation which has caused the informing condition to be satisfied is low with both the cruise and informing conditions being satisfied and the own vehicle 10 is accelerated or decelerated by the cruise control, the second control apparatus permits the execution of the cruise control and forbids the execution of the informing control. On the other hand, as shown in a box (h) of FIG. 9, when the informing requirement level of the particular situation which has caused the informing condition to be satisfied is low with both the cruise and informing conditions being satisfied and the own vehicle 10 is not accelerated nor decelerated by the cruise control, the second control, apparatus permits both the execution of the cruise control and the execution of the informing control.

A summary of an operation of the second control apparatus has been described. Thereby, when the informing requirement level of the occurring particular situation is relatively low with both the cruise and informing conditions being satisfied and the own vehicle 10 being accelerated or decelerated by the cruise control, the execution of the cruise control is permitted and the execution of the informing control is forbidden (see the box (f) of FIG. 9). When the informing requirement level of the occurring particular situation is relatively high with both the cruise and informing conditions being satisfied and the own vehicle 10 being accelerated or decelerated by the cruise control, the execution of the cruise control is forbidden and the execution of the informing control is permitted (see the box (g) of FIG. 9). The aforementioned process of the second control apparatus is a third adjustment process.

Therefore, the driver of the own vehicle 10 can be surely informed of the occurrence of the particular situation having the high informing requirement level (see the box (f) of FIG. 9) and the aforementioned driver's misunderstanding derived from the simultaneous performance of the particular situation informing and the acceleration or deceleration of the own vehicle 10 by the cruise control can be prevented from being led (see the box (g) of FIG. 9). In other words, it is suitably determined whether any of the cruise control and the informing control should be executed or both the cruise control and the informing control should be executed, depending on the informing requirement level of the occurring particular situation.

Figure 10:
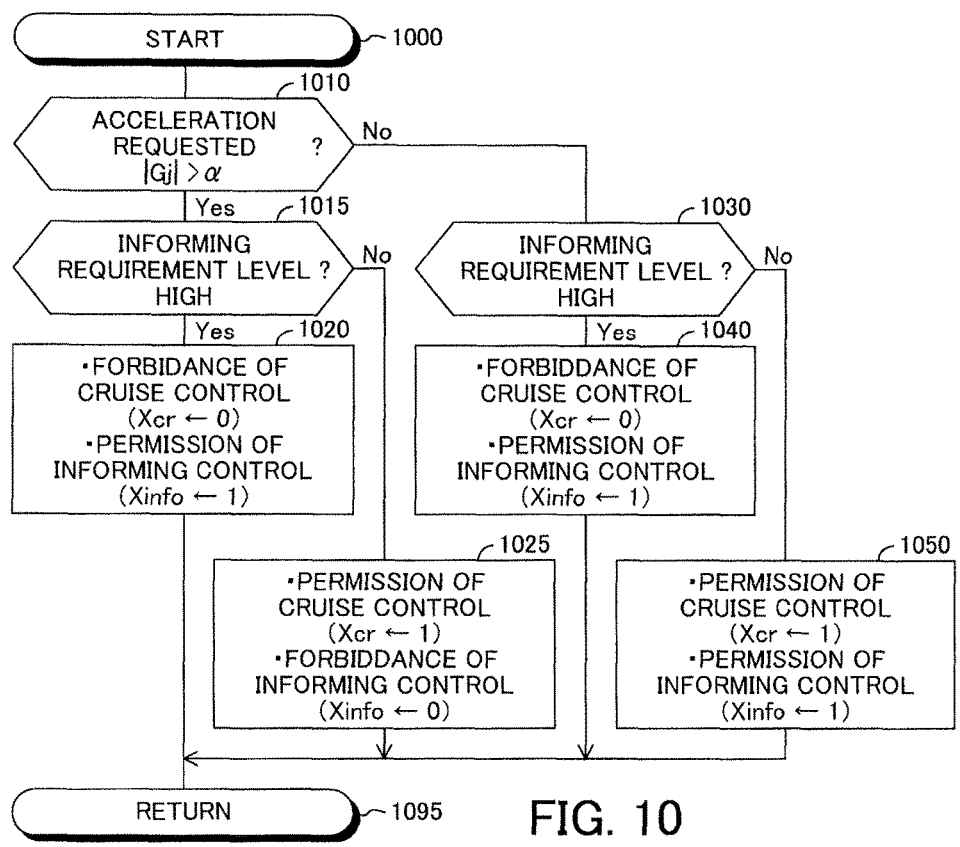
FIG. 10 is a flowchart for showing a routine executed by the CPU of the vehicle control ECU of the vehicle control apparatus according to the second modified example.

Next, a concrete operation of the second control apparatus will be described. When the CPU of the vehicle control ECU 20 of the second control apparatus proceeds with the process to the step 415 of FIG. 4, the CPU is configured or programmed to execute a routine shown by a flowchart in FIG. 10 in place of a routine shown in FIG. 8 to set the values of the cruise permission flag Xcr and the informing permission flag Xinfo, respectively.

In particular, when the CPU proceeds with the process to the 415 of FIG. 4, the CPU starts a process from a step 1000 and then, proceeds with the process to a step 1010 to determine whether or not the absolute value of the requested acceleration Gj calculated at the step 410 of FIG. 4 is larger than the predetermined threshold α.

When the absolute value of the requested acceleration Gj is larger than the predetermined threshold α and thus, the acceleration or deceleration of the own vehicle 10 which the driver of the own vehicle 10 can feel is requested, the CPU determines "Yes" at the step 1010 and then, proceeds with the process to a step 1015 to determine whether or not the informing requirement level set for the occurring particular situation is the high level. As described above, in this example, the high or low informing requirement level is set for each of the objects B1 to B4, depending on a level of a requirement of informing the driver of the occurrence of the particular situation where any of the objects B1 to B4 exists.

When the informing requirement level set for the occurring particular situation is the high level upon the execution of the process of the step 1015, the CPU determines "Yes"

at the step 1015 and then, proceeds with the process to a step 1020 to set the value of the cruise permission flag Xcr to "0" and the value of the informing permission flag Xinfo to "1". Then, the CPU proceeds with the process to the step 420 of FIG. 4 via a step 1095. In this case, the execution of the cruise control is terminated or is not started and the execution of the informing control is started or is continued by the processes of the steps 435 and 437 of FIG. 4.

On the other hand, when the informing requirement level set for the occurring particular situation is the low level upon the execution of the process of the step 1015, the CPU determines "No" at the step 1015 and then, proceeds with the process to a step 1025 to set the value of the cruise permission flag Xcr to "1" and the value of the informing permission flag Xinfo to "0". Then, the CPU proceeds with the process to the step 420 of FIG. 4 via the step 1095. In this case, the execution of the cruise control is started or continued and the execution of the informing control is terminated or is not started by the processes of the steps 425 to 439 of FIG. 4.

When the absolute value of the requested acceleration Gj is equal to or smaller than the predetermined threshold α upon the execution of the process of the step 1010, the CPU determines "No" at the step 1010 and then, proceeds with the process to a step 1030 to determine whether or not the informing requirement level set for the occurring particular situation is the high level.

When the informing requirement level set for the occurring particular situation is the high level, the CPU determines "Yes" at the step 1030 and then, proceeds with the process to a step 1040 to set the value of the cruise permission flag Xcr to "0" and the value of the informing permission flag Xinfo to "1". Then, the CPU proceeds with the process to the step 420 of FIG. 4 via the step 1095. In this case, the execution of the cruise control is terminated or is not started and the execution of the informing control is started or continued by the processes of the steps 435 to 437 of FIG. 4.

On the other hand, when the informing requirement level set for the occurring particular situation is the low level upon the execution of the process of the step 1030, the CPU determines "No" at the step 1030 and then, proceeds with the process to a step 1050 to set the values of the cruise permission flag Xcr and the informing permission flag Xinfo to "1", respectively. Then, the CPU proceeds with the process to the step 420 via the step 1095. In this case, the execution of the informing control is started or continued and the execution of the cruise control is started or continued by the processes of the steps 425 and 435 of FIG. 4.

The concrete operation of the second control apparatus has been described. According to the operation of the second control apparatus, when the acceleration or deceleration of the own vehicle 10 which the driver of the own vehicle 10 can feel is performed by the cruise control (see the determination "Yes" at the step 1010) and the informing requirement level set for the occurring particular situation is the high level (see the determination "Yes" at the step 1015) with both the cruise and informing conditions being satisfied (see the determination "Yes" at the step 405 of FIG. 4), the informing control is executed without executing the cruise control (see the step 1020). Therefore, the driver of the own vehicle 10 can be informed of the occurrence of the particular situation having the high informing requirement level without leading to the aforementioned driver's misunderstanding.

On the other hand, when the acceleration or deceleration of the own vehicle 10 which the driver of the own vehicle 10 can feel is performed by the cruise control (see the determination "Yes" at the step 1010) and the informing requirement level set for the occurring particular situation is the low level (see the determination "No" at the step 1015) with both the cruise and informing conditions being satisfied (see the determination "Yes" at the step 405 of FIG. 4), the cruise control is executed without executing the informing control (see the step 1025). Therefore, the cruise control can be executed, depending on the request of the driver of the own vehicle 10.

The present invention is not limited to the embodiment and various modifications can be employed within the scope of the present invention.

For example, as shown in FIGS. 11A and 11B, the embodiment control apparatus may be configured to determine whether any of the cruise control and the informing control should be executed or both the cruise control and the informing control should be executed when both the cruise and informing conditions is satisfied in consideration of whether the cruise condition or the informing condition becomes satisfied first and the informing requirement level.

In particular, in an example shown in FIG. 11A, as shown in a box (i) in FIG. 11A, when the cruise condition becomes satisfied before the informing condition becomes satisfied and the absolute value of the requested acceleration Gj is larger than the predetermined threshold α with both the cruise and informing conditions being satisfied, the vehicle control apparatus according to each of the first to fourth modified examples may be configured to permit the execution of the cruise control and forbid the execution of the informing control, independently of the informing requirement level set for the occurring particular situation.

On the other hand, as shown in a box (j) in FIG. 11A, when the cruise condition becomes satisfied before the informing condition becomes satisfied and the absolute value of the requested acceleration Gj is equal to or smaller than the predetermined threshold α with both the cruise and informing conditions being satisfied, the vehicle control apparatus according to each of the first to fourth modified examples may be configured to permit both the execution of the cruise control and the execution of the informing control, independently of the informing requirement level set for the occurring particular situation.

Further, as shown in a box (k) in FIG. 11B, when the cruise condition becomes satisfied after the informing condition becomes satisfied and the informing requirement level set for the occurring particular situation is the high level with both the cruise and informing conditions being satisfied, the vehicle control apparatus according to each of the first to fourth modified examples may be configured to forbid the execution of the cruise control and permit the execution of the informing control, independently of the requested acceleration Gj.

On the other hand, as shown in a box (l) in FIG. 11B, when the cruise condition becomes satisfied after the informing condition becomes satisfied and the informing requirement level set for the occurring particular situation is the low level with both the cruise and informing conditions being satisfied, the vehicle control apparatus according to each of the first to fourth modified examples may be configured to permit the execution of the cruise control and forbid the execution of the informing control, independently of the requested acceleration Gj.

As shown in the boxes (i) and (j) of FIG. 11A, the feature of the example shown in FIGS. 11A and 11B is that it is determined whether or not the informing control should be executed, depending on whether or not the own vehicle 10 is accelerated or decelerated by the cruise control, independently of the informing requirement level of the occurring particular situation when the cruise condition is satisfied before the informing condition is satisfied.

Alternatively, as shown in FIGS. 12A and 12B, the vehicle control apparatus according to another modified example of the embodiment may be configured to determine whether or not the cruise control and the informing control should be executed, respectively.

In particular, according to an example shown in FIG. 12A, as shown in a box (m) in FIG. 12A, when the cruise condition becomes satisfied before the informing condition becomes satisfied and the absolute value of the requested acceleration Gj is larger than the predetermined threshold $\alpha$ with both the cruise and informing conditions being satisfied, the vehicle control apparatus according to the another modified example may be configured to forbid the execution of the cruise control and permit the execution of the informing control, independently of the informing requirement level set for the occurring particular situation.

On the other hand, as shown in a box (n) in FIG. 12A, when the cruise condition becomes satisfied before the informing condition becomes satisfied and the absolute value of the requested acceleration Gj is equal to or smaller than the predetermined threshold $\alpha$ with both the cruise and informing conditions being satisfied, the vehicle control apparatus according to the another modified example may be configured to forbid the execution of the cruise control and permit the execution of the informing control, independently of the informing requirement level set for the occurring particular situation.

Further, as shown in a box (o) in FIG. 12A, when the cruise condition becomes satisfied before the informing condition becomes satisfied and the absolute value of the requested acceleration Gj is equal to or smaller than the predetermined threshold $\alpha$ and the informing requirement level set for the occurring particular situation is the low level with both the cruise and informing conditions being satisfied, the vehicle control apparatus according to the another modified example may be configured to permit both the execution of the cruise control and the execution of the informing control.

Further, as shown in a box (p) in FIG. 12B, when the cruise condition becomes satisfied after the informing condition becomes satisfied and the informing requirement level set for the occurring particular situation is the high level with both the cruise and informing conditions being satisfied, the vehicle control apparatus according to the another modified example may be configured to forbid the execution of the cruise control and permit the execution of the informing control, independently of the requested acceleration Gj.

On the other hand, as shown in a box (q) in FIG. 12B, when the cruise condition becomes satisfied after the informing condition becomes satisfied and the informing requirement level set for the occurring particular situation is the low level with both the cruise and informing conditions being satisfied, the vehicle control apparatus according to the another modified example may be configured to permit the execution of the cruise control and forbid the execution of the informing control, independently of the requested acceleration Gj.

As shown in the box (m) in FIG. 12A, the feature of the example shown in FIGS. 12A and 12B is that the execution of the cruise control is forbidden and the execution of the informing control is permitted, independently of the informing requirement level set for the occurring particular situation when the acceleration or deceleration of the own vehicle 10 which the driver of the own vehicle 10 can feel is requested by the cruise control even with the cruise condition becoming satisfied before the informing condition becomes satisfied.

Further, as shown in the boxes (n) and (o) in FIG. 12A, the feature of the example shown in FIGS. 12A and 12B is that it is determined whether or not the execution of the cruise control and the execution of the informing control should be executed, respectively, depending on the informing requirement level set for the occurring particular situation when the acceleration or deceleration of the own vehicle 10 which the driver of the own vehicle 10 can feel is not requested by the cruise control even with the cruise condition becoming satisfied before the informing condition becomes satisfied.

It should be noted that the cooperative following travel control (CACC) which is one of the cruise controls is, for example, a following control. That is, the acceleration of the own vehicle 10 necessary for causing the own vehicle 10 to travel following the preceding vehicle 11 is calculated during the execution of the cooperative following travel control on the basis of data expressing the operation state amounts such as the requested acceleration and the actual acceleration of the preceding vehicle 11 which the own vehicle 10 receives from the preceding vehicle 11 through the wireless communication. Further, the requested acceleration Gj is calculated on the basis of the calculated acceleration of the own vehicle 10 and the acceleration necessary for maintaining the inter-vehicle distance D at the set inter-vehicle distance Dtgt. Then, the acceleration of the own vehicle 10 is controlled such that the requested acceleration Gj is achieved (for example, see JP 2015-51716).

Further, the constant vehicle speed travel control which is one of the cruise controls is a control for controlling the acceleration of the own vehicle 10 such that the own vehicle speed SPDj is maintained at the set vehicle speed SPDtgt.

In addition, each of the embodiment control apparatus and the vehicle control apparatuses according to the modified examples may be configured to use the actual acceleration of the own vehicle 10 such as temporal differentiation dSPDj/dt of the own vehicle speed SPDj in place of the requested acceleration Gj during the execution of the cruise control. In this case, the case that the absolute value of the actual acceleration is larger than a predetermined threshold $\beta$ which is close to "0" and larger than "0" corresponds to the case that the absolute value of the requested acceleration Gj is larger than the predetermined threshold $\alpha$. On the other hand, the case that the absolute value of the actual acceleration is equal to or smaller than the predetermined threshold $\beta$ corresponds to the case that the absolute value of the requested acceleration Gj is equal to or smaller than the predetermined threshold $\alpha$.

What is claimed is:

1. A vehicle control apparatus, comprising:
an electronic control unit configured to execute a cruise control for causing an own vehicle to travel without a driver of the own vehicle operating an acceleration operator of the own vehicle and a brake operator of the own vehicle when a cruise condition is satisfied; and
a road situation information acquisition device configured to acquire road situation information on a road situation from outside of the own vehicle through a wireless communication;
wherein the electronic control unit is configured:
to determine whether or not an informing condition is satisfied on the basis of the road situation information when the own vehicle is traveling, the informing condition becoming satisfied when a particular situation, of which the driver of the own vehicle should operate the brake operator to decelerate the own vehicle, occurs;

to execute an informing control for alerting the driver of the own vehicle when the informing condition is satisfied; and to execute a first adjustment process:
- for forbidding an execution of the informing control and permitting an execution of the cruise control when both the informing condition and the cruise condition are satisfied and the own vehicle is accelerated or decelerated by the cruise control, and
- for permitting both the execution of the informing control and the execution of the cruise control when both the informing condition and the cruise condition are satisfied and the own vehicle is neither accelerated nor decelerated by the cruise control.

2. The vehicle control apparatus according to claim 1, wherein the electronic control unit is configured:

to execute the first adjustment process when the informing condition becomes satisfied with the cruise control having been executed since the cruise condition becomes satisfied before the informing condition becomes satisfied; and to execute a second adjustment process for permitting the execution of the informing control and forbidding the execution of the cruise control when the cruise condition becomes satisfied with the informing control having been executed since the informing condition becomes satisfied before the cruise condition becomes satisfied.

3. The vehicle control apparatus according to claim 1, wherein the electronic control unit is configured:

to execute the first adjustment process when the own vehicle is accelerated or decelerated by the cruise control and a predetermined informing requirement level is a low requirement level with both the informing condition and the cruise condition being satisfied, the informing requirement level representing a level of a requirement of informing the driver of the own vehicle of an occurrence of the particular situation; and to execute a third adjustment process for permitting the execution of the informing control and forbidding the execution of the cruise control when the own vehicle is accelerated or decelerated by the cruise control and the predetermined informing requirement level is a high level with both the informing condition and the cruise condition are satisfied.

* * * * *